(12) United States Patent
Nemmers et al.

(10) Patent No.: US 11,538,123 B1
(45) Date of Patent: Dec. 27, 2022

(54) DOCUMENT REVIEW AND EXECUTION ON MOBILE DEVICES

(71) Applicant: Wells Fargo Bank, N.A., San Francisco, CA (US)

(72) Inventors: Sarah Marie Nemmers, Rogers, MN (US); Aaron John Ziegler, Minneapolis, MN (US); Mark Edward Woodrow, San Diego, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 206 days.

(21) Appl. No.: 16/255,392

(22) Filed: Jan. 23, 2019

(51) Int. Cl.
  *G06Q 50/18* (2012.01)
  *G06T 11/60* (2006.01)
  *G06F 21/62* (2013.01)
  *G06F 40/109* (2020.01)

(52) U.S. Cl.
  CPC ......... *G06Q 50/18* (2013.01); *G06F 21/6209* (2013.01); *G06F 40/109* (2020.01); *G06T 11/60* (2013.01)

(58) Field of Classification Search
  CPC ...... G06Q 50/18; G06Q 40/00; G06F 40/109; G06F 40/143; G06F 40/106; G06F 40/103; G06F 40/10; G06F 21/6209; G06T 11/60
  See application file for complete search history.

(56) References Cited

U.S. PATENT DOCUMENTS

| | | | |
|---|---|---|---|
| 7,383,498 B1* | 6/2008 | Hickl | G06F 40/154 715/235 |
| 7,478,064 B1* | 1/2009 | Nacht | G06Q 40/025 705/38 |
| 7,653,876 B2 | 1/2010 | Ethier et al. | |
| 8,572,388 B2 | 10/2013 | Boemker et al. | |
| 8,707,164 B2 | 4/2014 | Adler, III et al. | |
| 8,838,980 B2 | 9/2014 | Gonser et al. | |
| 9,195,636 B2 | 11/2015 | Smith et al. | |
| 9,292,618 B2 | 3/2016 | Melnyk et al. | |
| 9,507,760 B2 | 11/2016 | Dunn et al. | |
| 2004/0139327 A1* | 7/2004 | Brown | H04L 9/3297 713/176 |
| 2006/0184452 A1 | 8/2006 | Barnes et al. | |
| 2010/0114995 A1* | 5/2010 | Kopp | G06F 16/3331 707/811 |
| 2010/0274803 A1* | 10/2010 | Machii | G06F 16/93 707/769 |
| 2010/0315440 A1 | 12/2010 | Castro et al. | |

(Continued)

OTHER PUBLICATIONS

T. O. Wells, "Electronic and digital signatures: in search of a standard," IT Professional, vol. 2, No. 3, pp. 24-30, May-Jun. 2000, pp. 24-30 (Year: 2000).*

(Continued)

*Primary Examiner* — Sarah M Monfeldt
*Assistant Examiner* — Michael J. Monaghan
(74) *Attorney, Agent, or Firm* — Merchant & Gould P.C.

(57) ABSTRACT

A method for tailoring a document for viewing on a mobile device includes obtaining residence information for an individual who is required to sign the document. The document is tailored to the residence of the individual. This includes hiding or condensing one or more portions of the document that pertain to laws in other jurisdictions. The document is permitted to be accessible by the mobile device.

17 Claims, 13 Drawing Sheets

(56) References Cited

U.S. PATENT DOCUMENTS

| | | | | |
|---|---|---|---|---|
| 2011/0093769 | A1* | 4/2011 | Dunn | G06F 40/174 |
| | | | | 715/221 |
| 2013/0088511 | A1* | 4/2013 | Mitra | G06F 3/0483 |
| | | | | 345/629 |
| 2014/0047556 | A1* | 2/2014 | Davis | G06F 21/606 |
| | | | | 726/28 |
| 2014/0143172 | A1 | 5/2014 | Richter et al. | |
| 2015/0052420 | A1 | 2/2015 | Churchwell et al. | |
| 2015/0150141 | A1* | 5/2015 | Szymanski | G06F 16/93 |
| | | | | 726/26 |
| 2015/0178252 | A1* | 6/2015 | Dunn | G06Q 10/103 |
| | | | | 715/234 |
| 2015/0213568 | A1* | 7/2015 | Follis | G06Q 50/18 |
| | | | | 705/311 |
| 2015/0378973 | A1 | 12/2015 | Korneev | |
| 2016/0054898 | A1* | 2/2016 | Kotler | G06F 16/986 |
| | | | | 715/209 |
| 2016/0224523 | A1* | 8/2016 | Shimkus | G06F 40/197 |
| 2017/0206366 | A1* | 7/2017 | Fay | G06F 21/604 |
| 2017/0220813 | A1* | 8/2017 | Mullins | G06F 21/10 |
| 2017/0322681 | A1 | 11/2017 | Allison et al. | |
| 2018/0005186 | A1 | 1/2018 | Hunn | |
| 2018/0241569 | A1* | 8/2018 | Harmon | H04L 67/18 |
| 2019/0005265 | A1* | 1/2019 | Panchapakesan | G06F 21/6254 |
| 2019/0050587 | A1* | 2/2019 | Dang | G06F 16/1774 |
| 2019/0377779 | A1* | 12/2019 | Gelosi | G06F 40/51 |

OTHER PUBLICATIONS

Ruiz-Martinez et al., "A Survey of Electronic Signature Solutions in Mobile Devices," http://www.jtaer.com/statistics/download/download.php?co_id=JTA20070307, University of Murcia, Department of Information and Communications Engineering, 2007, 16 pages.

* cited by examiner

DOCUMENT REVIEW AND EXECUTION ON MOBILE DEVICES

BACKGROUND

Mobile devices, such as smartphones, are commonly used to perform a variety of tasks, including tasks that used to be performed only on desktop electronic devices or via hard copy. For example, when customers of a financial institution need to review and execute a loan document, instead of reviewing and executing the loan document in person or via a desktop or laptop computer, customers often want to be able to review and execute the loan document on their smartphones.

When a loan document, for example for a car loan or other personal loan, is reviewed on a mobile device, it is sometimes difficult to adequately present the contents of the document on a small display screen of the mobile device so that a borrower can review and understand the terms of the document, sign the document and create a legally binding document and/or form a legally binding agreement. In addition, many documents have requirements, specified by state or federal regulations, to adequately highlight certain content, such as an interest rate of a loan. Compliance with these requirements can sometimes be difficult to achieve on a small display screen.

SUMMARY

Embodiments of this patent application are directed to a method implemented on an electronic computing device for tailoring a document for viewing on a mobile device, the method comprising: identifying one or more individuals who are required to sign the document; when the one or more individuals include co-borrowers, tailoring the document for each of the co-borrowers who are required to sign the document, comprising omitting or disabling one or more portions of the document pertaining to a non-viewing co-borrower; and permitting the document to be accessible by the mobile device.

In another aspect, a method implemented on an electronic computing device for tailoring a financial document for viewing on a mobile device comprises: receiving from the mobile device identification for an individual who is to review and sign a financial document at the mobile device; obtaining a state of residence for the individual; tailoring the financial document to the state of residence for the individual, comprising hiding or condensing one or more portions of the document that pertain to laws of other states in the United States; tailoring the financial document to the individual, comprising omitting or disabling one or more portions of the financial document pertaining to anyone other than the individual who is required to sign the financial document; and sending the financial document to the mobile device.

In yet another aspect, an electronic computing device comprises: at least one processor; and system memory, the system memory including instructions which, when executed by the processing unit, cause the electronic computing device to: receive a request from a mobile device for a financial document; receive from the mobile device identification for an individual who is to review and sign the financial document at the mobile device; obtain a state of residence for the individual; tailor the financial document to the state of residence for the individual, comprising hiding one or more portions of the financial document that pertain to laws of other states of the United States; tailor the financial document to the individual, comprising omitting or disabling one or more portions of the financial document pertaining to anyone other than the individual who is required to sign the financial document; tailor the financial document to comply with federal or state laws or regulations, comprising highlighting each instance in the financial document of an interest rate or finance charge in bold or in a color other than black; and send the financial document to the mobile device.

The details of one or more techniques are set forth in the accompanying drawings and the description below. Other features, objects, and advantages of these techniques will be apparent from the description, drawings, and claims.

DETAILED DESCRIPTION

Figure 1:
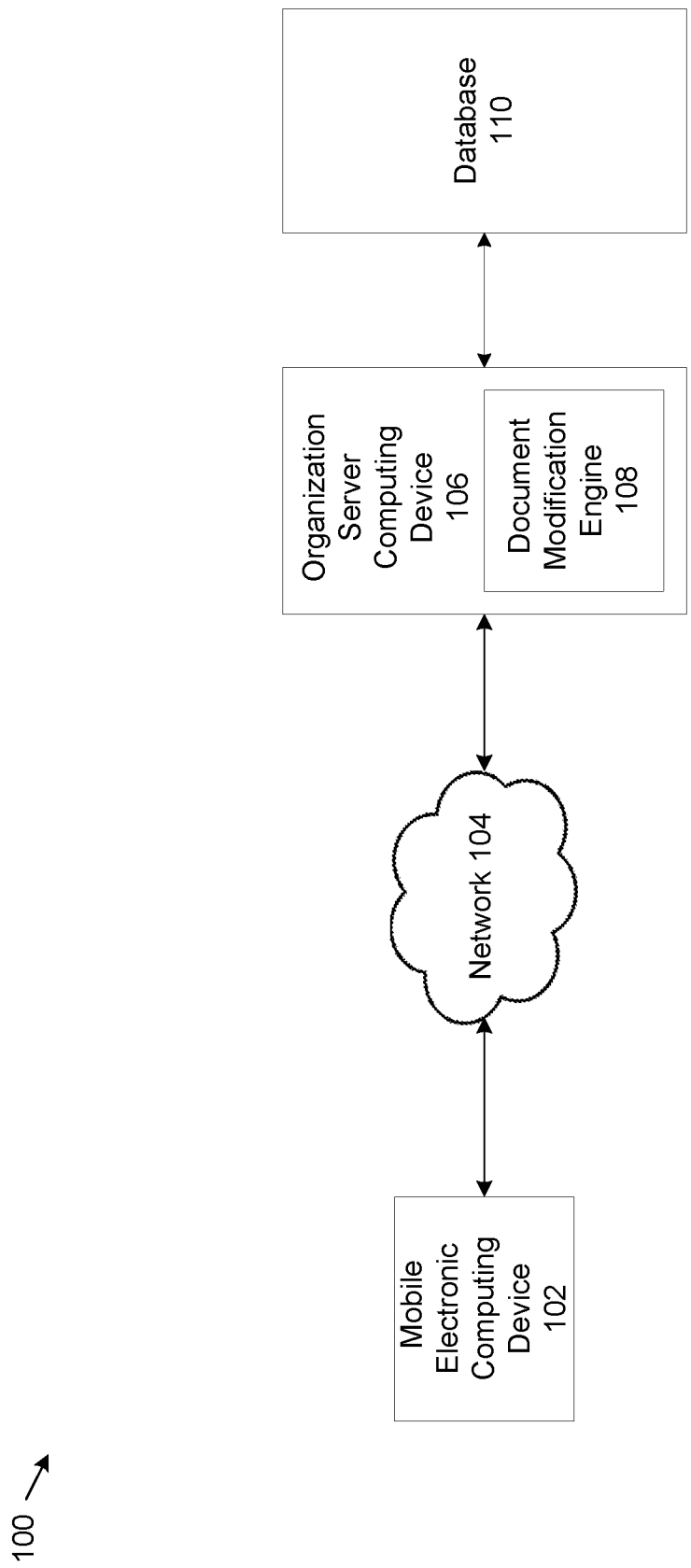
FIG. 1 shows an example system that supports reviewing and executing a document on a small device.

The present disclosure is directed to systems and methods for reviewing and executing documents on small, mobile devices. Using the systems and methods, documents can be converted from one format to a different format to permit customization of the document. In addition, documents are reviewed for presentation on the small, mobile devices so that the presentation complies with parameters determined by state and federal law, regulations regarding consumer lending and e-Commerce, court rulings, industry standards, and best practices.

In an example embodiment, a document is taken from a first format to a second format that is more easily rendered and presented on a small screen, such as that of a smartphone or other mobile device. For instance, a source document, for example a Portable Document Format (PDF) document, is converted to a hypertext markup language (HTML) version of the document. The HTML version of the document can then be displayed on a display screen of a mobile device, such as a smartphone. By displaying the HTML version of the document instead of the PDF, the document can be modified to fit a size of the display screen, to highlight certain features of the document, to display signature boxes where needed, to adjust content of the document based on a state of residence of an individual named in the document, and to adjust content of the document based on who is reviewing the document. In some implementations, the source document can be converted into other formats besides HTML, for example XML, format.

In the disclosed embodiment, the source document is a PDF document, although the source document can also be in other formats. For example, in an alternative embodiment, the source document could be stored as one or more data elements in a database. In such an example, one or more database queries are made to obtain the data as the source document. This data can then be converted to a second format, such as HTML, as described herein.

The document can be provided by an organization, for example a financial institution such as a bank. In this disclosure, the document is a loan closing document for items such as personal lines and loans, automobile loans, and/or mortgages. The loan closing document can comprise one or more unexecuted contractual documents that define the terms of a loan. Other loan closing documents are possible. In this disclosure, an individual who reviews and signs the loan closing document is referred to as a borrower.

The document may be a standard document than can be modified based on a geographical location at which a borrower resides. For example, certain states of the United States can have different state law requirements. For a document that can be used throughout the United States, a particular file format for the document, such as a PDF version of the document, can include requirements for multiple states. When viewing the PDF version of the document, the borrower would only need to review sections of the document pertaining to the state in which the borrower resides. However, the HTML version of the document can hide or condense the sections of the document that do not pertain to the borrower and only fully display sections relating to the state in which the borrower resides. The borrower can click to maximize and display hidden or condensed content if they wish.

The HTML version of the document can also be modified based on who is accessing the document. For example when two co-borrowers jointly review a personal loan and signatures of both are required for each of the co-borrowers on the loan closing documents, when the loan closing document is displayed on a first co-borrower's smartphone, only a signature box for the first co-borrower may be displayed, or the second co-borrower's signature box may be grayed out, disabled, or cut out. Similarly, when the document is displayed on the second co-borrower's smartphone, only the signature box for the second co-borrower may be displayed, or the first co-borrower's signature box may be grayed out, disabled, or cut out. Similarly, when a single borrower is reviewing the document, items pertaining to a co-borrower may be grayed out, disabled or cut out.

When presenting certain documents to a borrower for review and execution, organizations are required to comply with federal and state laws and regulations regarding openness and transparency. Some examples of compliance requirements include making sure the document is readable and legible and that pertinent information is highlighted so that the information is easily viewable by the borrower. Examples can include showing an interest rate of a loan, a monthly payment and a total of payments over the course of the loan in bold font, in a bright color or enclosed in a box so that the information can be easily see the information. Another example is to use font sizes that are easily legible by the borrower and to avoid the use of small or fine fonts. In addition, requirements of certain state and federal laws related to electronic transactions that are not specific to the financial industry (for example federal E-SIGN and the state equivalent, the Uniform Electronic Transactions Act) may be addressed and/or incorporated. Other examples are possible.

Other features of the document can include click and confirm buttons, in which the borrower can click a button to confirm that the borrower has viewed a section of the document and confirms an understanding of the section of the document. The organization can also receive feedback when the borrower scrolls or otherwise advances to a new section of the document.

The systems and methods can also provide authentication methods to verify the borrower and any co-borrowers. Various method of authentication can be used including biometrics and geo-location. Example biometric authentication can include fingerprints, retinal scan and voiceprints. Geo-location can aid in authentication by verifying that the borrower is at a location known to be one that the borrower frequents or a location that can be considered a safe location. In addition, geo-location can be used to provide evidence of where a document was reviewed and executed.

The systems and methods discussed herein are directed to a computing technology that can automatically modify a document in a first format (e.g., PDF) to a second format that can be customized for an individual, that can comply with federal and state regulations regarding transparency and openness and that can permit the individual to review, understand and sign the document on a small device in order to create a legally binding document and/or form a legally binding agreement. The systems and method provides efficiencies in rendering documents on small devices. Because the documents can be modified to highlight interest rates, finance charges, disclaimers, etc., in compliance with federal and state laws and regulations, a signature on the document indicates that the borrower has read and understood the highlighted items.

FIG. 1 shows an example system 100 that can support reviewing and executing a document on a small device. System 100 includes a mobile electronic computing device 102, a network 104, an organization server computing device 106 and a database 110. The organization server computing device 106 and include a document modification engine 108. More, fewer, or different components are possible.

The example mobile electronic computing device 102 is an electronic computing device of an individual who may be reviewing and executing a loan document from an organization. The mobile electronic computing device 102 is typically a smartphone, but can also be another type of mobile device, such as a tablet computer. Other mobile electronic computing devices are possible. Mobile electronic computing device 102 can include global positioning system (GPS) software, or other technology or software that identifies geographic, that can provide a current geolocation of mobile electronic computing device 102.

In some examples, the system 100 is configured to determine a type of device for the mobile electronic computing device 102. Certain types of devices may be excluded from the disclosed systems and methods. For example, in some embodiments, devices with small screens, such as smart watches like an Apple Watch, may be excluded. In other examples, non-smart devices, such as traditional cellular phones without smart capabilities, can also be excluded. The system 100 can be programmed to determine a type of the mobile electronic computing device 102 and exclude such types.

The example network 104 is a computer network and can be any type of wireless network, wired network and cellular network, including the Internet. Mobile electronic computing device 102 can communicate with organization server computing device 106 using network 104.

The example organization server computing device 106 is a server computer of an organization, for example a financial organization, that can provide a loan document to the borrower to review and sign. The organization can store an HTML and/or PDF version of the document. In some implementations, organization server computing device 106 can convert the PDF of the document to an HTML format and send the document in the HTML format or provide access to the document in the HTML format to the borrower at mobile electronic computing device 102. In other implementations, organization server computing device 106 can send the PDF of the document to mobile electronic computing device 102. Mobile electronic computing device 102 can then convert the PDF of the document to an HTML format and display the document in HTML format on mobile electronic computing device 102. In yet other implementations, organization server computing device 106 can send a different type of source document to mobile electronic computing device 102 (e.g., data from a database), and the mobile electronic computing device 102 can then convert the source document to an HTML format and display the document in HTML format on mobile electronic computing device 102.

The example document modification engine 108 converts a PDF version of the document into an HTML version, modifies the HTML version based on state of residence and an identity of the borrower who is to review and sign the document, and processes borrower inputs from the document. Document modification engine 108 can interact with database 110 to obtain information regarding the borrower, including the state of residence of the borrower. Document modification engine 108 can also interact with mobile electronic computing device 102 to obtain data regarding borrower interactions with the document, including a current section of the document that the borrower is viewing and confirmations and signatures from the borrower. A confirmation is an acknowledgement by the borrower that the borrower has reviewed a specific section of the document or has signed the document.

The example database 110 is a database associated with the organization of organization server computing device 106. Database 110 can store a plurality of documents as well as personal information regarding individuals who are required to review and sign one or more of the documents. Organization server computing device 106 can be programmed to query (e.g. using Structured Query Language, SQL) database 110 to obtain the document and the personal information.

An example schema including, but not limited to, document and borrower personal information stored in database 110 is shown below. More, fewer, or different fields are possible.

Borrower Name—the name of the borrower;
Borrower ID— a set of letters, numbers, or other symbol that uniquely identifies the borrower;
Borrower home address—a set of letters and numbers that specify the home address;
Borrower state of residence—a state of the United States in which the borrower resides;
Co-borrower Name—the name of a co-borrower;
Co-borrower ID—a set of letters, numbers, or other symbol that uniquely identifies the co-borrower;
Co-borrower home address—a set of letters and numbers that specify the home address of the co-borrower;
Co-borrower state of residence—a state of the United States in which the co-borrower resides;
Pointer to loan documents—a pointer to loan documents that are available to be reviewed and/or signed by the borrower and a co-borrower.

The above schema permits the database to be queried for data such as the state of residence for the borrower.

As an example, the following messaging format can be used between the organization server computing device 106 and the database 110 to obtain the state of residence for the borrower.

| Borrower Name | Borrower state of residence |
|---|---|

As an example, the database 110 can use the following messaging format in responding to such a request. In this example, borrower state of residence is returned in response to the request.

| John Doe | Minnesota |
|---|---|

Figure 2:
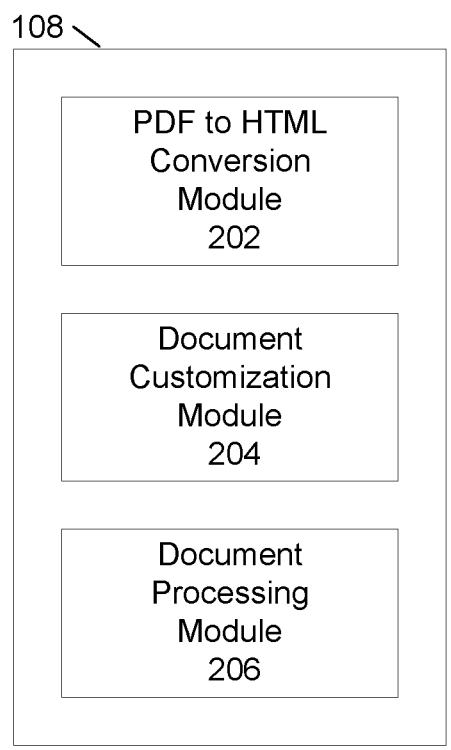
FIG. 2 shows example modules of the loan document engine of FIG. 1.

FIG. 2 show example modules 200 of document modification engine 108. The modules 200 include a PDF to HTML conversion module 202, a document customization module 204 and a document processing module 206. More, fewer, or different modules are possible.

The example PDF to HTML conversion module 202 converts the PDF version of the document into an HTML version. The PDF to HTML conversion module 202 can include standard PDF to HTML conversion software.

The example document customization module 204 obtains information regarding the borrower and uses the information to customize the HTML version of the document for review by the borrower. The information regarding the borrower can include such items as whether there is a co-borrower and the state of the United States in which the borrower and co-borrower resides. The information can be obtained from database 110 or from data stored on organization server computing device 106. Other information regarding the borrower can be obtained.

Document customization module 204 can use the information obtained to modify the HTML version of the document accordingly. For example, document customization module 204 can hide or condense sections of HTML that are not relevant to the state in which the borrower resides. As another example, document customization module 204 can gray out or otherwise disable a signature box not relevant to the borrower, such as a signature box for the co-borrower in a joint loan document. Other modifications are possible.

The example document processing module 206 receives inputs from mobile electronic computing device 102 when the borrower accesses the document on mobile electronic computing device 102. The inputs can include such items as a current section of the document that the borrower is viewing, inputs from confirmation acknowledgment buttons on the document, and inputs from signature boxes on the document. Other inputs are possible.

Figure 3:
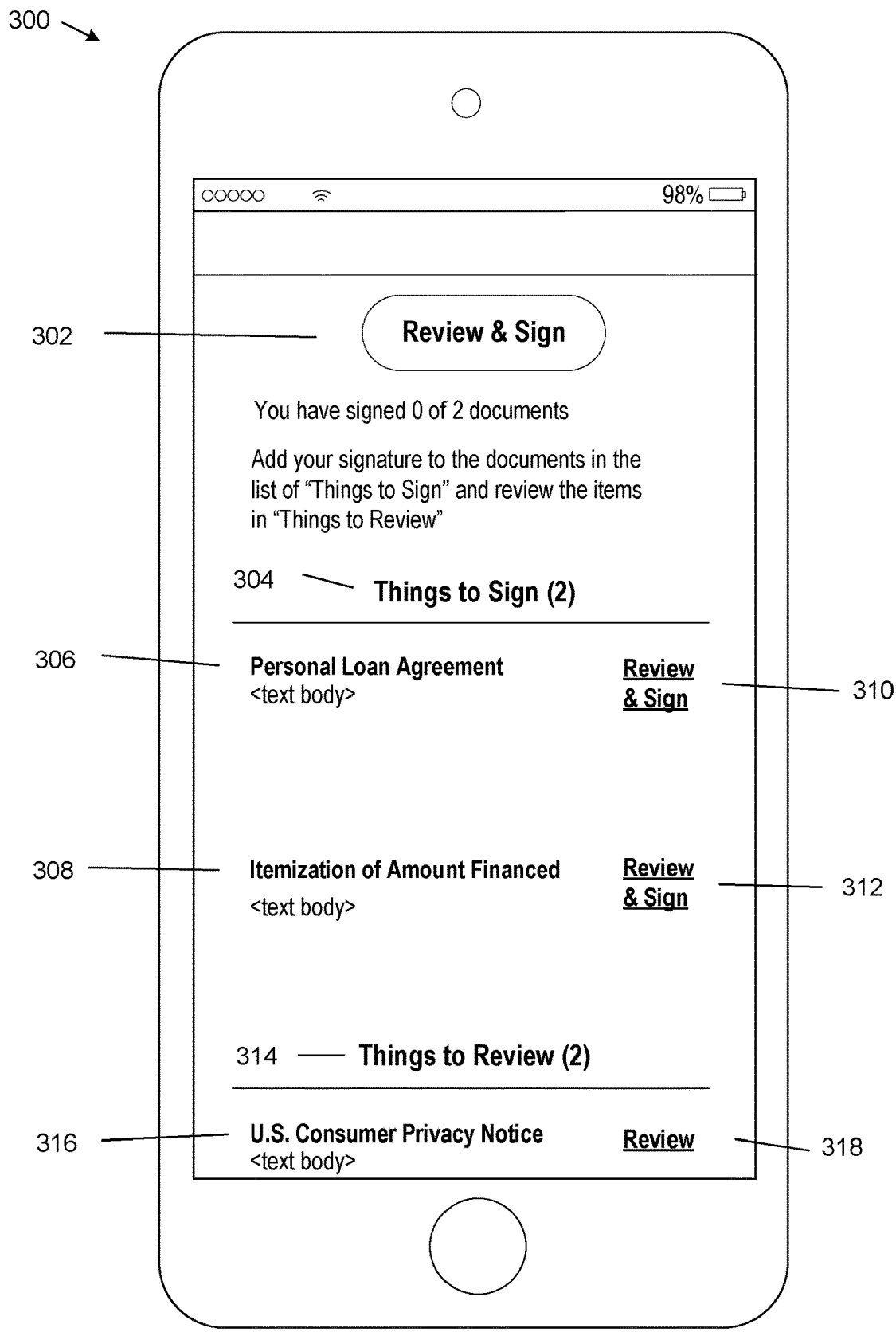
FIG. 3 shows an example user interface of a display screen of the mobile electronic computing device of FIG. 1.

FIG. 3 shows an example user interface 300 rendered on a display screen of a mobile electronic computing device, for example, mobile electronic computing device 102, on which a review and sign screen 302 for a financial document is rendered. In an example implementation, the review and sign screen 302 can be rendered when the borrower clicks on a link for the financial document. For example, the link can be sent to the borrower in an email or a text message.

In another example implementation, the borrower can log into a website of a financial institution at which the borrower has one or more financial accounts or which is processing a loan document for the borrower. Content that requires action by the borrower can appear as a link on the website. The content can be presented in the form of a PDF document for downloading or printing or in HTML for online viewing.

User interface 300 includes heading 304 indicating that there are two documents for the borrower to sign. One is a Personal Loan Agreement 306 and another is an Itemization of Amount Financed 308. When the borrower clicks on the example review and sign link 310, the example Personal Loan Agreement 306 document is rendered on mobile electronic computing device 102, as discussed in more detail later herein. When the borrower clicks on itemization of amount financed link 312, an example Itemization of Amount Financed that indicates the total amount of credit extended and how the funds will be disbursed is displayed on mobile electronic computing device 102.

User interface 300 also includes heading 314 indicating there are two documents for the borrower to review. One is a U.S. consumer privacy notice 316. When the borrower clicks on the example review link 318, an example U.S. consumer privacy notice 316 is displayed for the borrower to review. Another document to review, not shown on user interface 300, can be a Credit Score Disclosure Notice. Other documents to review are possible.

Figure 4:
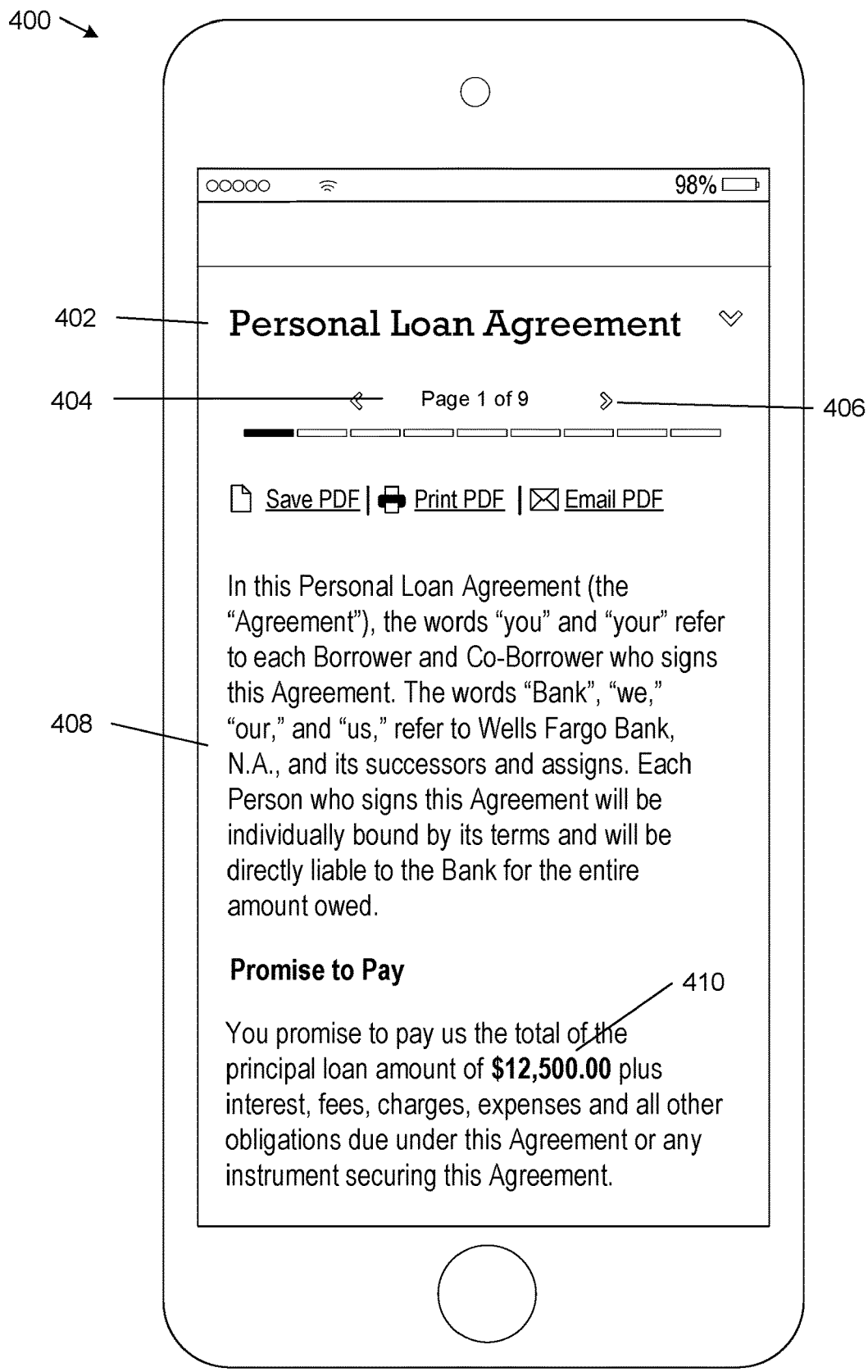
FIG. 4 shows another example user interface of a display screen of the mobile electronic computing device of FIG. 1.

FIG. 4 shows an example user interface 400 for a first page of a Personal Loan Agreement 402. The first page is indicated by page number 404. A forward indicator 406 permits the borrower to advance to a second page of the Personal Loan Agreement 402, once the borrower has confirmed that they have reviewed and understood the content of the first page. The borrower is not permitted to advance to a new page in the document until he/she has acknowledged and confirmed a review of each preceding page.

The example first page of the Personal Loan Agreement 402 includes a paragraph 408. The example paragraph 408 references a promise to pay the financial institution a total principal loan amount 410 of $12,500.00 plus interest, fees, charges, expenses and other obligations. The loan amount 410 ("$12,500.00") is bolded to make it more prominent to the borrower.

The first page of the Personal Loan Agreement 402 corresponds to a specific section of the document, for example, a first page of a PDF of the document, or an introductory section of the document. When the example first page of the Personal Loan Agreement 402 includes more information than can be displayed on a size of the display screen of mobile electronic computing device 102, the borrower can scroll through the first page by moving his/her fingers up on the display screen. Other means of scrolling, for example by using a mouse, are possible.

Figure 5:
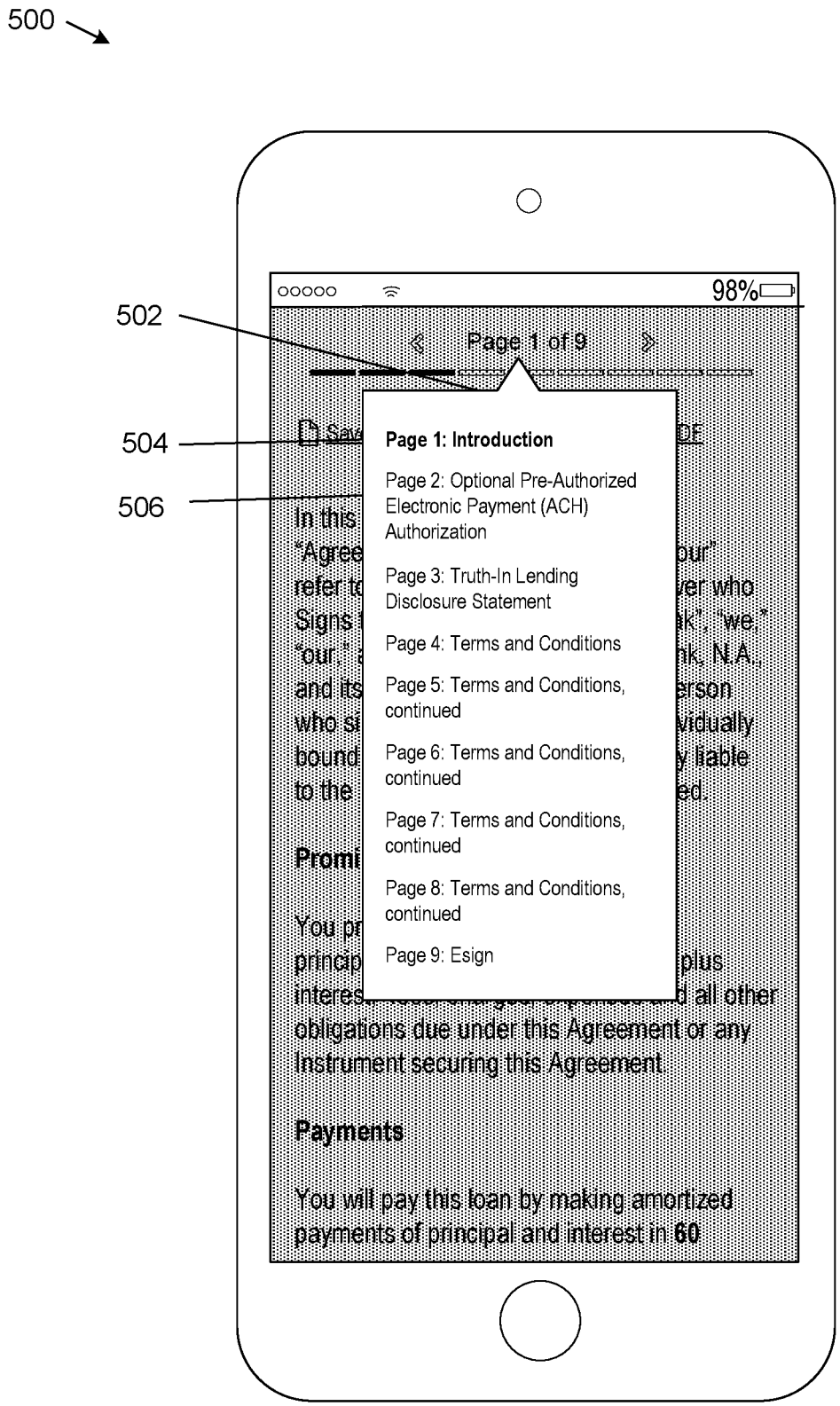
FIG. 5 shows yet another example user interface of a display screen of the mobile electronic computing device of FIG. 1.

FIG. 5 shows an example user interface 500 that includes an index 502. The example index 502 is overlaid on a current page that is being displayed. The index 502 includes titles and links for each of the nine pages in the Personal Loan Agreement 402. An example page 1 title 504 is bolded because page 1 is currently displayed. An example page 2 title 506 is not bolded. However, when the borrower selects page 2 title 506, contents from page 2 are displayed on the display screen of mobile electronic computing device 102. However, the borrower cannot advance to a page unless the borrower has confirmed understanding of a current page.

For the implementation for user interface 500, the index 502 can be activated by the borrower swiping his/her fingers down from the top of the display screen of mobile electronic computing device 102. In other implementations, an icon for activating the index can be included at the top of the display screen of mobile electronic computing device 102. Other means for activating the index are possible.

Figure 6:
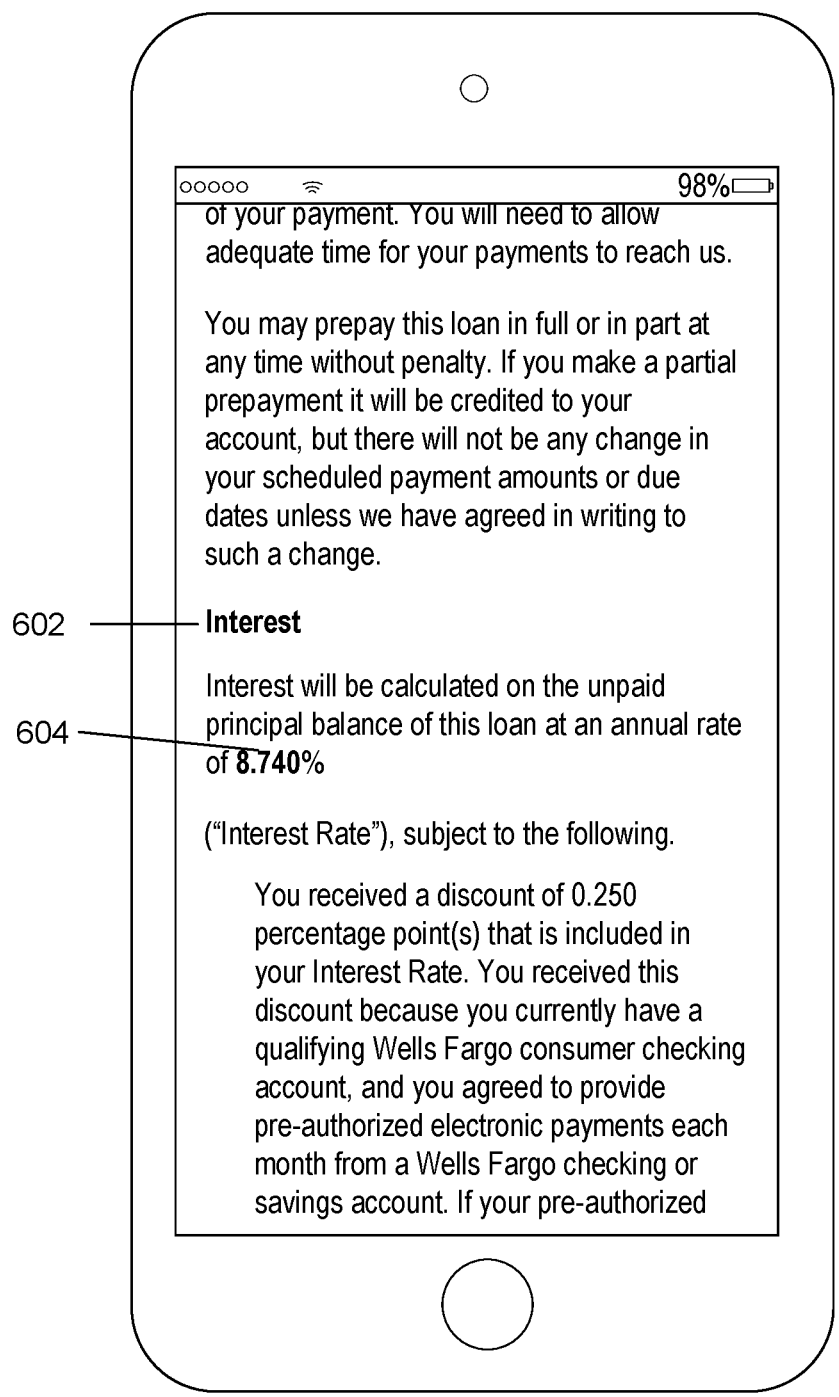
FIG. 6 shows yet another example user interface of a display screen of the mobile electronic computing device of FIG. 1.

FIG. 6 shows an example user interface 600 that shows a section of the Personal Loan Agreement 402 document that includes heading 602 regarding interest for the personal loan. The example heading 602 states that interest will be calculated on the unpaid principal balance of the personal loan at an annual rate of 8.740%. The interest rate 604 of 8.740% is shown in bold to make it make it more prominent to the borrower.

Figure 7:
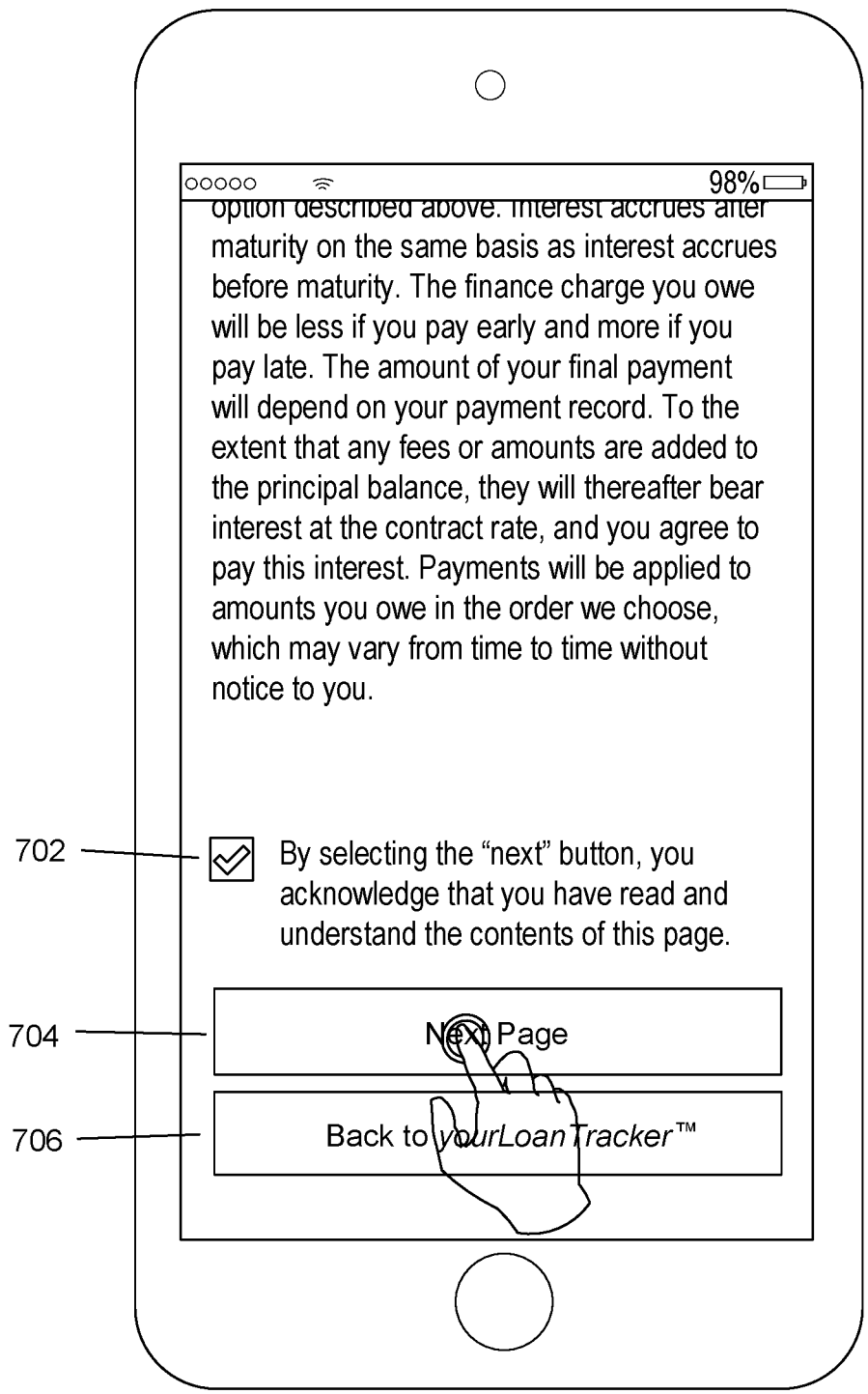
FIG. 7 shows yet another example user interface of a display screen of the mobile electronic computing device of FIG. 1.

FIG. 7 shows an example user interface 700 that includes an end of a current displayed page of the loan. User interface 700 includes a checkbox 702, a next page button 704 and a back button 706. The borrower can check the example checkbox 702 to confirm that he/she has read and understood the contents of the current displayed page. The confirmation is submitted when the borrower selects the example next page button 704. The example back button 706 permits the borrower to exit the Personal Loan Agreement 402 document and not indicate confirmation of understanding of the current page of the Personal Loan Agreement 402 document. The next page button 704 is used to display the next sequential display page. It should be noted that each displayed page does not necessarily align with a pagination in a paper version of the document.

Figure 8:
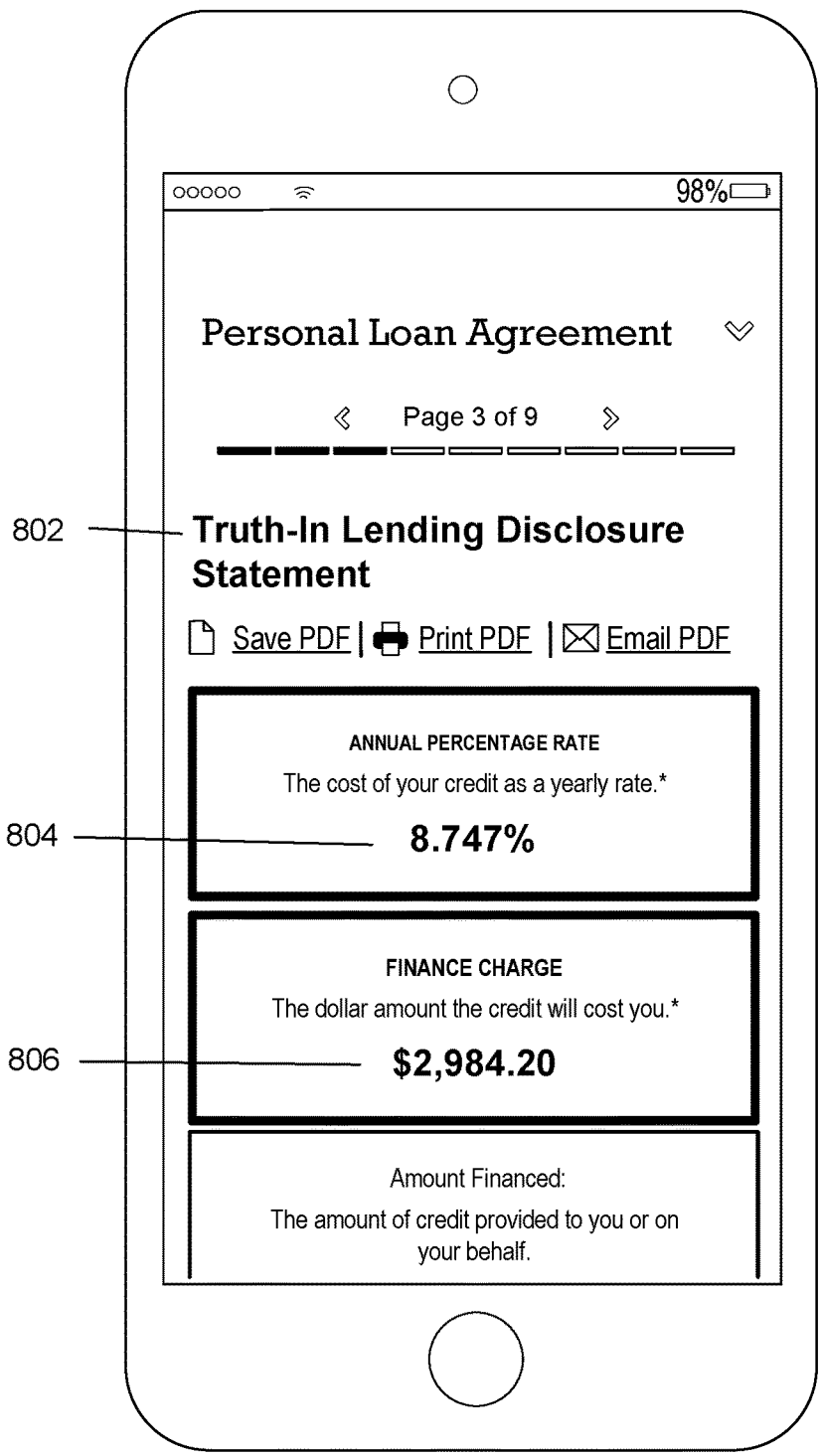
FIG. 8 shows yet another example user interface of a display screen of the mobile electronic computing device of FIG. 1.

FIG. 8 shows an example user interface 800 that shows an example Truth-In-Lending Disclosure Statement 802. For the example shown in FIG. 8, the Truth-In-Lending Disclosure Statement 802 corresponds to page 3 of Personal Loan Agreement 402. The Truth-In-Lending Disclosure Statement 802 displays in large bold type an annual percentage rate 804 for the personal loan and a finance charge 806 for the loan. As shown on user interface 800, the annual percentage rate 804 for the loan is 8.747% and the finance charge 806 for the personal loan is $2,984.20. The use of large bold type and boxes enclosing both the annual percentage rate 804 and the finance charge 806 complies with regulatory requirements.

Figure 9:
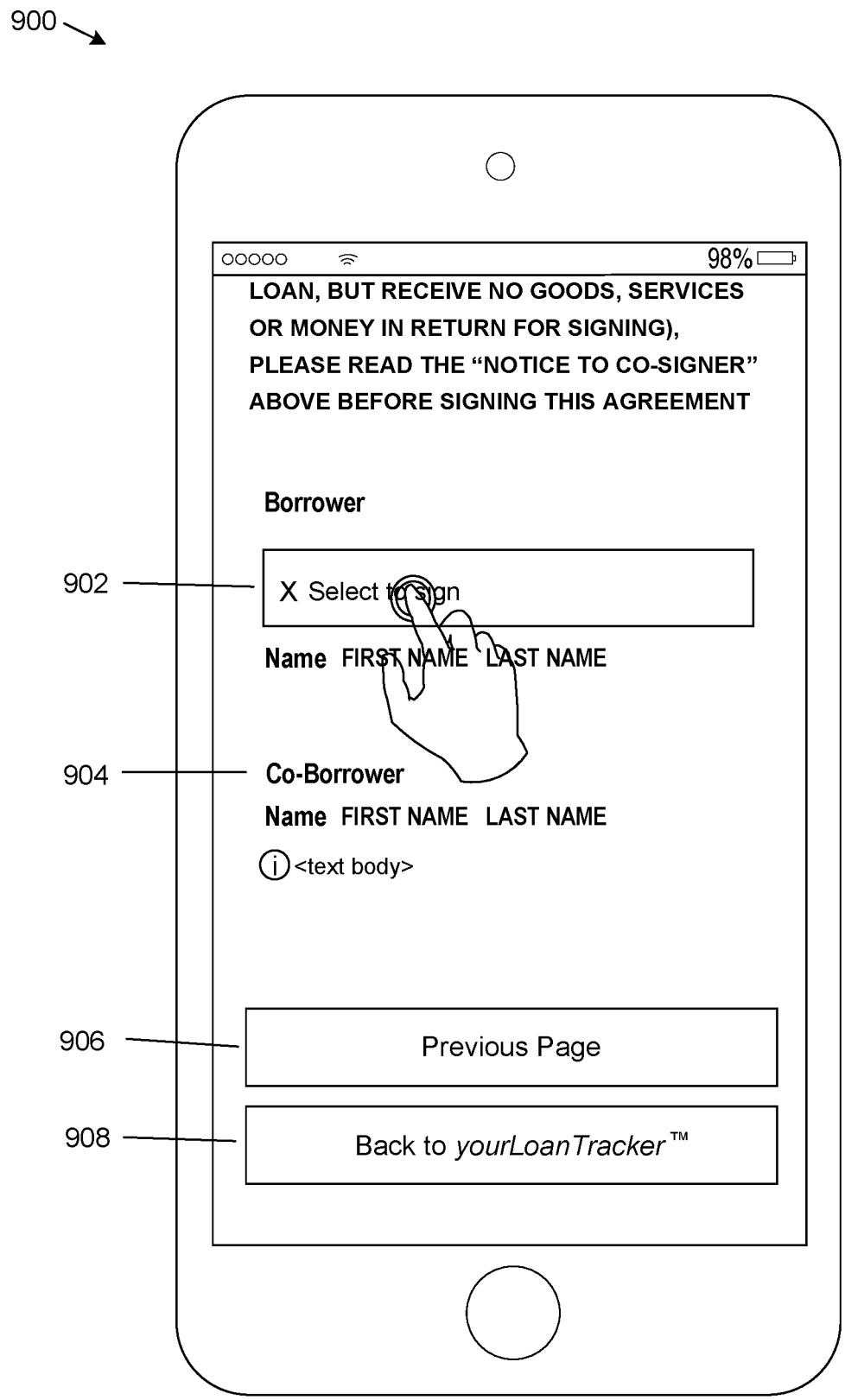
FIG. 9 shows yet another example user interface of a display screen of the mobile electronic computing device of FIG. 1.

FIG. 9 shows an example user interface 900 that includes an end of the Personal Loan Agreement 402. User interface 900 shows a signature box 902 for a borrower. Signature box 902 permits the borrower to electronically sign his/her name to confirm that the borrower agrees with the terms of the Personal Loan Agreement 402. The borrower must click to sign and then click to confirm adding his/her signature. The borrower cannot use his/her fingers to sign.

In a preferred implementation, a three-step signature process is used to prevent accidently signing and submitting the document with a mistaken click. In step one, the borrower clicks signature box 902. In step two, the borrower clicks on a signature confirmation overlay (for example confirm signature button 1004 of FIG. 10). In step three, the borrower clicks on a finish and submit button (for example finish and submit button 1108 of FIG. 11). Other implementations are possible, for example using biometrics (for example retinal scan) or some other method instead of clicking.

User interface 900 also includes a designator 904 for a co-borrower. However, as discussed earlier herein, the HTML, version of the PDF document takes into account who is reviewing/signing the document. For user interface 900, it is the borrower who is reviewing the document. Therefore, there is no signature box shown for the co-borrower.

User interface 900 also include a previous page button 906 and a back button 908. The previous page button 906 permits a return to a start of the previous page of the Personal Loan Agreement 402 document. The back button 908 permits the borrower to exit the Personal Loan Agreement 402 document without completing the signature process, if desired.

Figure 10:
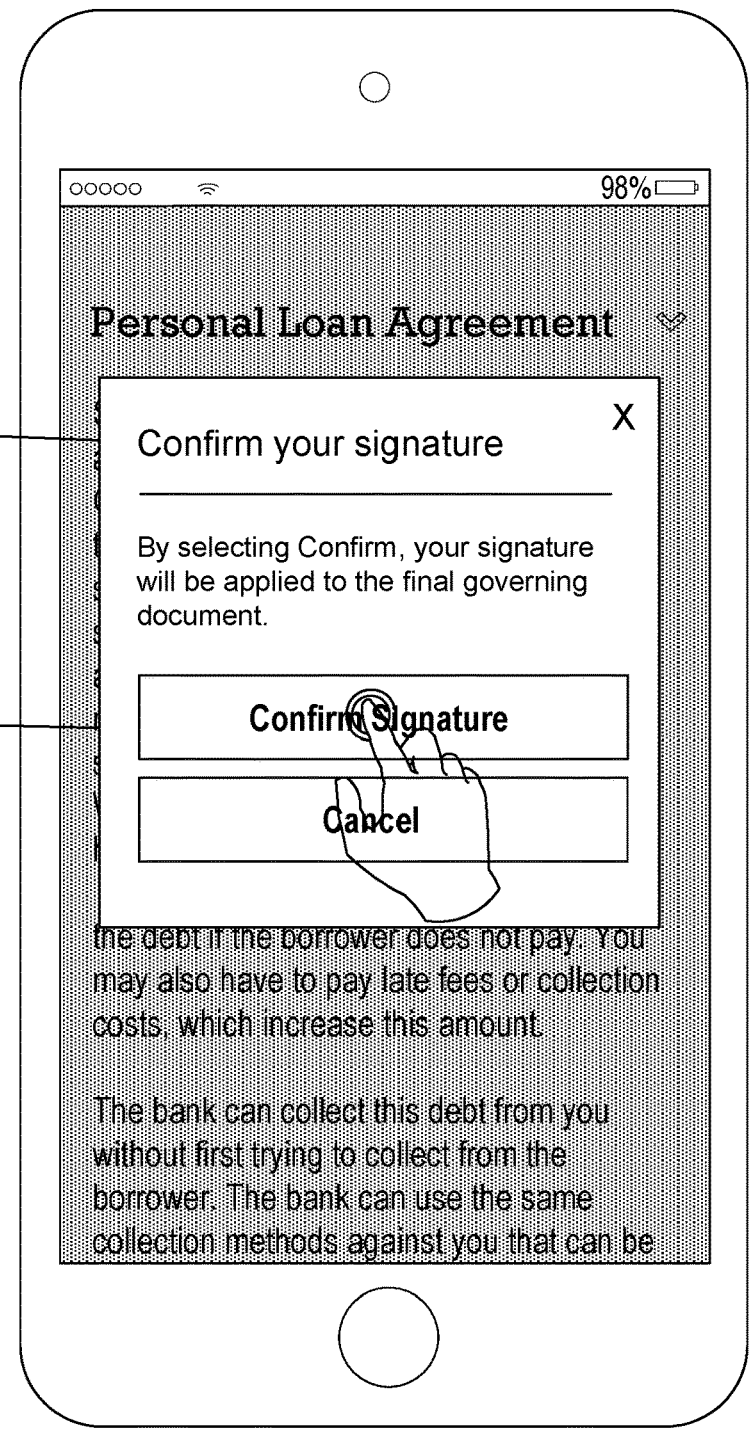
FIG. 10 shows yet another example user interface of a display screen of the mobile electronic computing device of FIG. 1.

FIG. 10 shows an example user interface 1000 that includes a signature confirmation overlay 1002. The signature confirmation overlay 1002 can be displayed when the borrower clicks on signature box 902 for the borrower or a corresponding signature box for the co-borrower. The borrower can confirm the signature of signature box 902 by clicking on confirm signature button 1004. The confirmation of the signature permits a finish and submit page to be rendered on the display screen.

Figure 11:
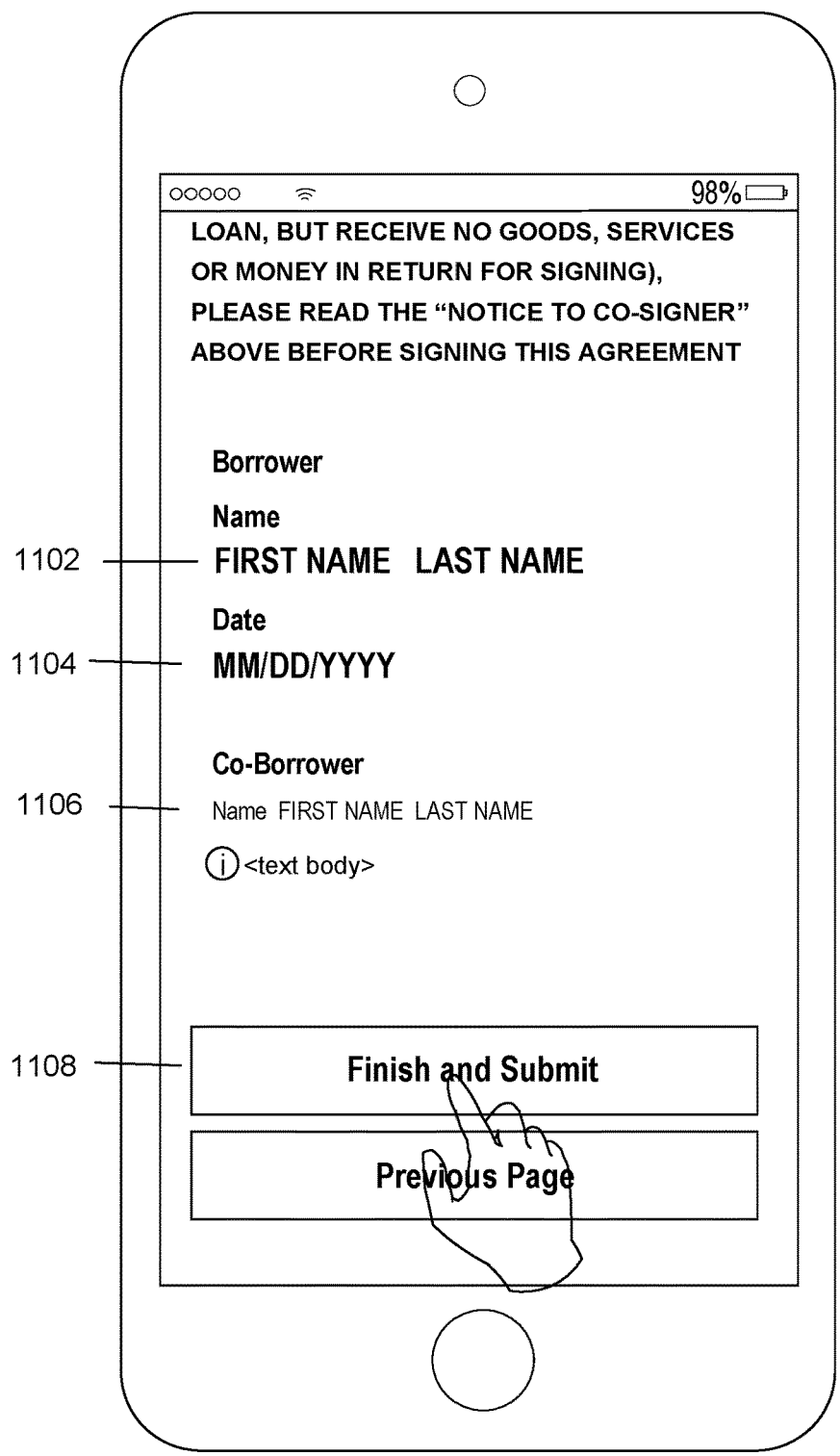
FIG. 11 shows yet another example user interface of a display screen of the mobile electronic computing device of FIG. 1.

FIG. 11 shows an example user interface 1100 for a finish and submit page. The example finish and complete page includes a name of a borrower 1102 who reviewed and signed the Personal Loan Agreement 402, the date 1104 on which the borrower signed the Personal Loan Agreement 402, a name of a co-borrower 1106 and a finish and submit button 1108. As shown in FIG. 11, the example borrower 1102 is Trisha Allex, the date 1104 on which the borrower signed the Personal Loan Agreement 402 is Jul. 5, 2017, and the example co-borrower is Sam Smith. When the borrower 1102 selects the finish and submit button 1108, the Personal Loan Agreement 402 is submitted for borrower 1102 to organization server computing device 106.

Figure 12:
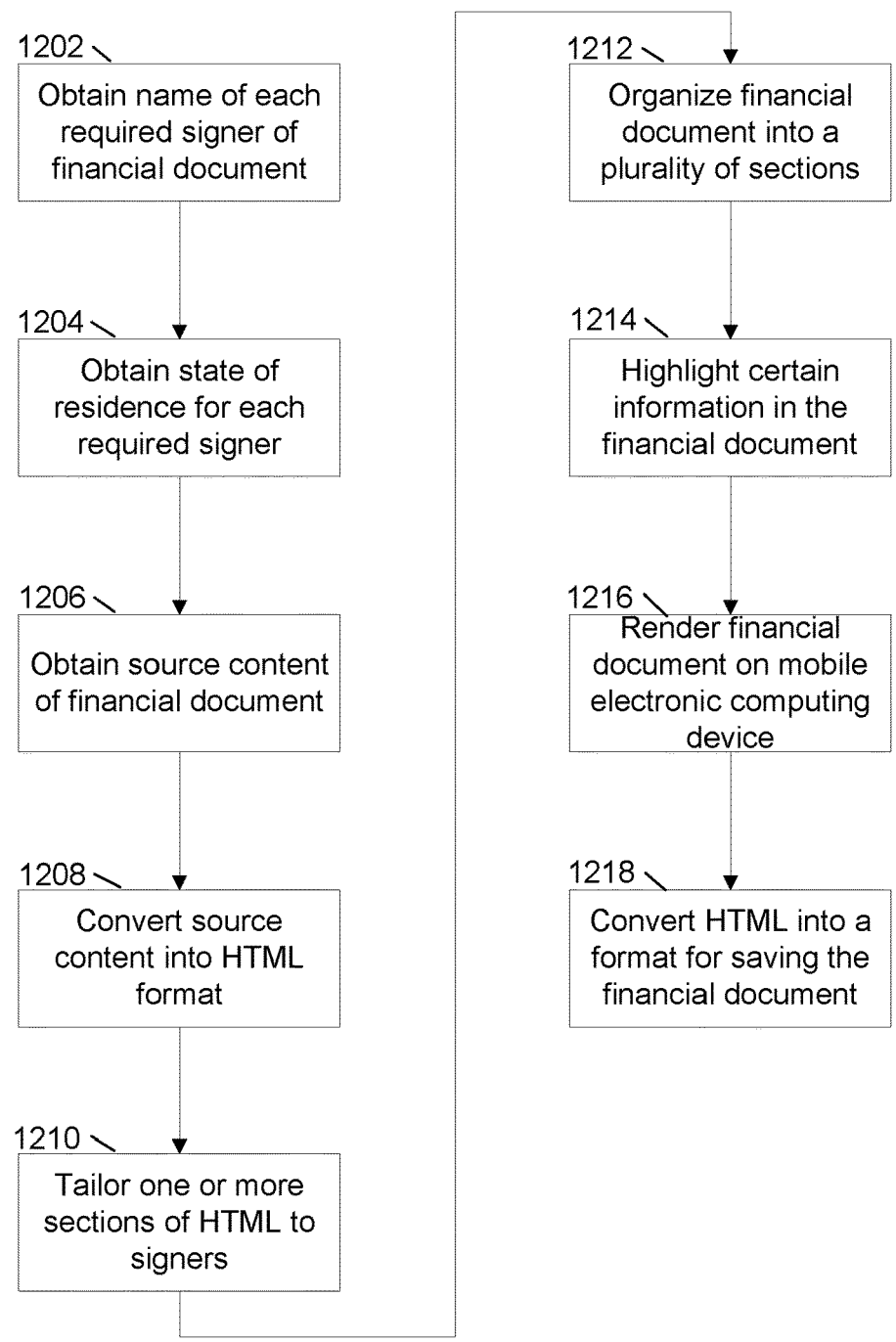
FIG. 12 shows an example method for generating a customized HTML version of a financial document.

FIG. 12 shows a flowchart for an example method 1200 for generating a customized HTML version of a financial document on organization server computing device 106. The HTML version is generated from a source financial document, in this implementation a PDF version of the financial document. For method 1200, the financial document is a Personal Loan Agreement. The HTML version customizes the PDF version of the Personal Loan Agreement by tailoring the PDF version in accordance with an identity of a number of borrowers who review and sign the Personal Loan Agreement, and in accordance with a state of the United States in which the borrowers reside, a type of mobile device being used and the content of the Personal Loan Agreement.

At operation 1202, organization server computing device 106 obtains the names of each required signer of the Personal Loan Agreement.

At operation 1204, the state of residence for each required signer is obtained. The state of residence, comprising the state of the United States in which each required signer resides, can be obtained from information provided by the required signer and stored on organization server computing device 106 or on database 110.

At operation 1206, a PDF of the Personal Loan Agreement is obtained. In an example implementation, the PDF is stored on organization server computing device 106 or obtained from database 110.

At operation 1208, the PDF of the Personal Loan Agreement is converted into HTML format. Organization server computing device 106 uses standard PDF to HTML conversion software for this purpose.

At operation 1210, one or more sections of the Personal Loan Agreement are tailored to the person who is reviewing and signing the document. Tailoring the one or more sections of the Personal Loan Agreement can comprise hiding or condensing any portion of the Personal Loan Agreement pertaining to a state of the United States in which the required signer does not reside. Tailoring the one or more sections of the Personal Loan Agreement can also comprise providing signature boxes only to the required signer who is reviewing and signing the document. Signature boxes for other required signers who are not reviewing and signing the document can be removed or disabled from the HTML version of the Personal Loan Agreement.

At operation 1212, the HTML version of the Personal Loan Agreement is organized into a plurality of sections. Each section can comprise one or more pages of the Personal Loan Agreement. Example sections can include an introductory section, a section on payments and interest, a section containing the Truth-In-Lending Disclosure Statement, a section describing in detail terms and conditions for the loan, a section on dispute resolution, a section on relevant state law, and a section for signatures and confirmations. Other sections are possible. In an example implementation, the content in the Personal Loan Agreement is arranged so that information that the organization wants to be prominently displayed is displayed at or near a top of a mobile page and/or is contained within a page or pages that only addresses the particular subject matter.

At operation 1214, certain financial information is highlighted in the Personal Loan Agreement. The financial information that is highlighted can include such items as an interest rate for the personal loan, a finance charge for the personal loan and a term of the personal loan. The highlighting can be implemented via bolding the financial information using HTML, increasing a font size, shading, changing color, and enclosing the information in a box, using HTML formatting. Other highlighting is possible.

At operation 1216, the Personal Loan Agreement is rendered on mobile electronic computing device 102. When the Personal Loan Agreement is rendered on mobile electronic computing device 102, mobile electronic computing device 102 determines how to organize the Personal Loan Agreement so that it is optimally displayed on mobile electronic computing device 102.

Mobile electronic computing device 102 can obtain the HTML version of the Personal Loan Agreement from organization server computing device 106. For example, method 1200, the required signer who is viewing the document can activate a software application on mobile electronic computing device 102 and sign-in to the software application. As a result of signing in, mobile electronic computing device 102 can obtain the HTML version of the Personal Loan Agreement from organization server computing device 106.

At operation 1218, the HTML version of the Personal Loan Agreement is converted into a format, for example a PDF format, in which the Personal Loan Agreement can be saved and in which a non-modifiable record of the Personal Loan Agreement can be preserved for retention purposes by both the borrower(s) and the organization.

Figure 13:
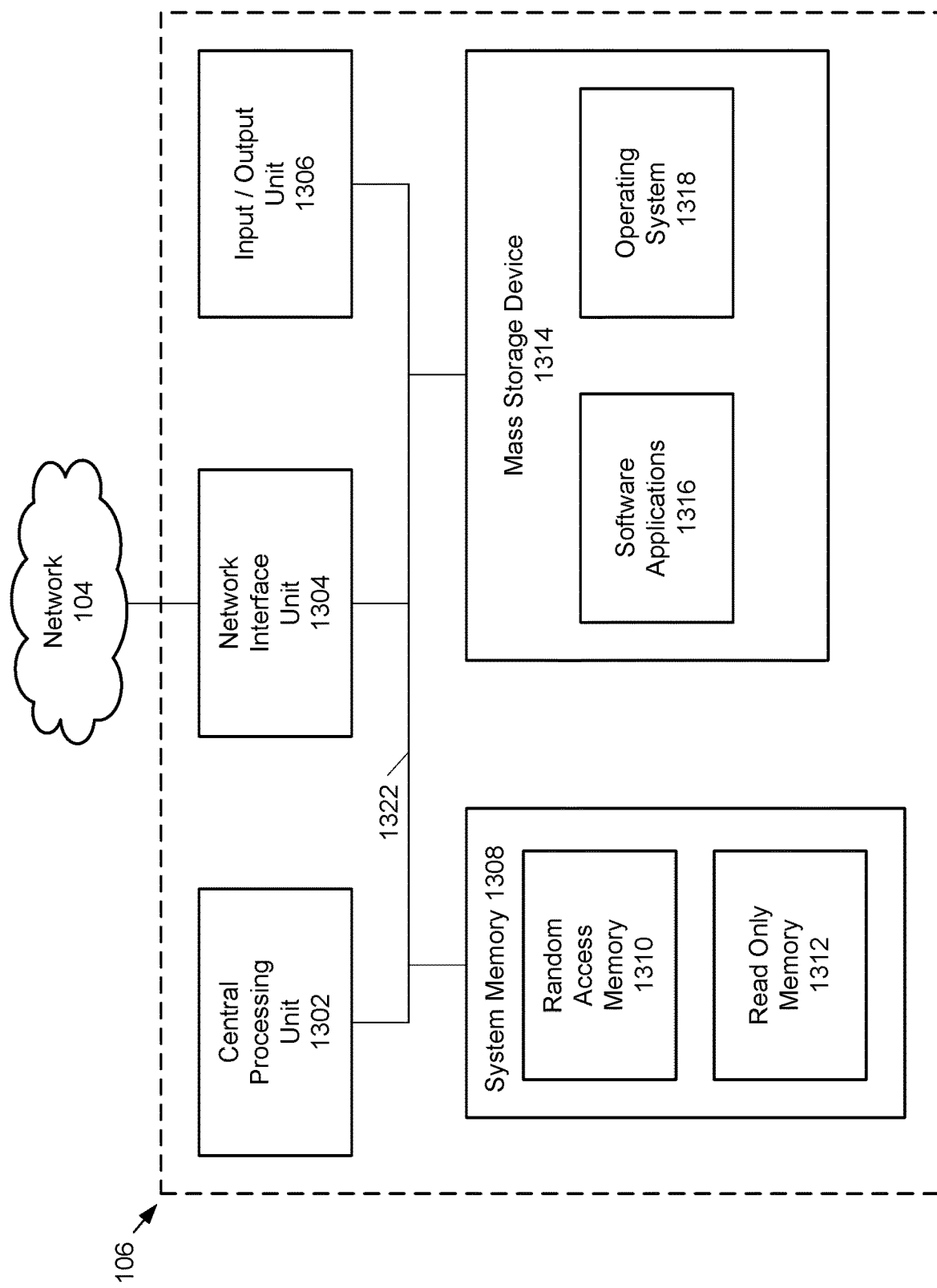
FIG. 13 shows example physical components of the organization server computing device of the system of FIG. 1.

As illustrated in the example of FIG. 13, organization server computing device 106 includes at least one central processing unit ("CPU") 1302, also referred to as a processor, a system memory 1308, and a system bus 1322 that couples the system memory 1308 to the CPU 1302. The system memory 1308 includes a random access memory ("RAM") 1310 and a read-only memory ("ROM") 1312. A basic input/output system that contains the basic routines that help to transfer information between elements within the organization server computing device 106, such as during startup, is stored in the ROM 1312. The organization server computing device 106 further includes a mass storage device 1314. The mass storage device 1314 is able to store software instructions and data. Some or all of the components of the organization server computing device 106 can also be included in mobile electronic computing device 102.

The mass storage device 1314 is connected to the CPU 1302 through a mass storage controller (not shown) connected to the system bus 1322. The mass storage device 1314 and its associated computer-readable data storage media provide non-volatile, non-transitory storage for the organization server computing device 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computing device 106.

According to various embodiments of the invention, the organization server computing device 106 may operate in a networked environment using logical connections to remote network devices through the network 104, such as a wireless network, the Internet, or another type of network. The organization server computing device 106 may connect to the network 104 through a network interface unit 1304 connected to the system bus 1322. It should be appreciated that the network interface unit 1304 may also be utilized to connect to other types of networks and remote computing systems. The organization server computing device 106 also includes an input/output controller 1306 for receiving and processing input from a number of other devices, including a touch user interface display screen, or another type of input device. Similarly, the input/output controller 1306 may provide output to a touch user interface display screen or other type of output device.

As mentioned briefly above, the mass storage device 1314 and the RAM 1310 of the organization server computing device 106 can store software instructions and data. The software instructions include an operating system 1318 suitable for controlling the operation of the organization server computing device 106. The mass storage device 1314 and/or the RAM 1310 also store software instructions and software applications 1316, that when executed by the CPU 1302, cause the organization server computing device 106 to provide the functionality of the organization server computing device 106 discussed in this document. For example, the mass storage device 1314 and/or the RAM 1310 can store software instructions that, when executed by the CPU 1302, cause the organization server computing device 106 to display received data on the display screen of the organization server computing device 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for tailoring a document for viewing on a mobile device, the method comprising:
   identifying one or more individuals who are required to sign the document;
   when the one or more individuals include co-borrowers, tailoring the document for each of the co-borrowers who are required to sign the document on the mobile device, comprising omitting one or more portions of the document pertaining to a non-viewing co-borrower so that the one or more portions are not displayed, including:
      removing the one or more portions and condensing a remainder of the document surrounding the one or more portions;
      displaying first content of the document associated with a viewing co-borrower upon viewing by the viewing co-borrower;
      allowing the viewing co-borrower to scroll through the first content of the document;
      tailoring the document to include a signature block for the viewing co-borrower required to sign the document, including:
         receiving a selection of the signature block from the viewing co-borrower;
         generating a signature overlay on the first content of the document;
         receiving a confirmation of a signature by the viewing co-borrower on the signature overlay; and
      displaying second content associated with the non-viewing co-borrower upon viewing by the non-viewing co-borrower, wherein the second content includes at least one section of the document not displayed at all in the first content;
   permitting the document to be accessible by the mobile device;
   modifying the document to include an index of an entirety of a plurality of sections of the document that is overlaid on the document displayed on the mobile device; and
   allowing advancement to another page in the document only after confirmation is received for a current page of the document.

2. The method of claim 1, further comprising;
   obtaining residence information for an individual who is required to sign the document;
   tailoring the document to the residence for the individual, comprising hiding or condensing one or more portions of the document that pertain to laws in other jurisdictions.

3. The method of claim 1, wherein the one or more portions of the document that are omitted or disabled include another signature block for anyone other than the individual who is required to sign the document.

4. The method of claim 1, further comprising identifying one or more statements in the document that are required in the document to comply with federal or state laws and regulations.

5. The method of claim 4, further comprising tailoring the document to insert a box around the one or more statements in the document.

6. The method of claim 1, further comprising identifying one or more instances where an interest rate or a finance charge appears in the document, and including each instance of the interest rate or the finance charge in bold font or in a color other than black.

7. The method of claim 6, further comprising using hypertext markup language formatting to include the interest rate or the finance charge in the bold font or in the color other than black.

8. The method of claim 1, wherein the mobile device is a smartphone.

9. The method of claim 1, wherein the document is a closing document for a loan.

10. A method implemented on an electronic computing device for tailoring a financial document for viewing on a mobile device, the method comprising:
receiving from the mobile device identification for an individual who is to review and sign a financial document at the mobile device;
obtaining a state of residence for the individual;
tailoring the financial document to the state of residence for the individual, comprising hiding or condensing or more portions of the financial document that pertain to laws of other states in the United States;
tailoring the financial document to the individual, comprising omitting one or more portions of the financial document pertaining to anyone other than the individual who is required to sign the financial document so that the one or more portions are not displayed, including:
removing the one or more portions and condensing a remainder of the financial document surrounding the one or more portions;
displaying first content of the financial document associated with the individual upon viewing by the viewing individual;
allowing the viewing individual to scroll through the first content of the financial document;
tailoring the financial document to include a signature block for the viewing individual required to sign the financial document, including:
receiving a selection of the signature block from the viewing individual;
generating a signature overlay on the first content of the financial document;
receiving a confirmation of a signature by the viewing individual on the signature overlay; and
displaying second content associated with the anyone other than the individual upon viewing by the anyone other than the individual, wherein the second content includes at least one section of the financial document not displayed at all in the first content; and
sending the financial document to the mobile device, wherein the financial document is modified to include an index of an entirety of a plurality of sections of the financial document that is overlaid on the financial document displayed on the mobile device, and wherein advancement to another page in the financial document is allowed only after confirmation is received for a current page of the financial document.

11. The method of claim 10, comprising tailoring the financial document to comply with federal and state laws and regulations regarding financial information.

12. The method of claim 11, further comprising tailoring the financial document to insert a box around one or more statements in the financial document.

13. The method of claim 11, further comprising highlighting each instance in the financial document of an interest rate or a finance charge.

14. The method of claim 13, further comprising formatting each instance of the interest rate or the finance charge in bold or in a color other than black.

15. The method of claim 13, further comprising tailoring the financial document to insert a box around the interest rate or the finance charge.

16. The method of claim 12, further comprising tailoring the financial document to include another signature block for the individual required to sign the financial document.

17. An electronic computing device comprises:
at least one processor; and
system memory, the system memory including instructions which, when executed by the processor, cause the electronic computing device to:
receive a request from a mobile device for a financial document;
receive from the mobile device identification for an individual who is to review and sign the financial document at the mobile device;
obtain a state of residence for the individual;
tailor the financial document to the state of residence for the individual, comprising hiding one or more portions of the financial document that pertain to laws of other states of the United States;
tailor the financial document to the individual, comprising omitting one or more portions of the financial document pertaining to anyone other than the individual who is required to sign the financial document so that the one or more portions are not displayed, including to:
remove the one or more portions and condense a remainder of the financial document surrounding the one or more portions;
display first content of the financial document associated with the individual upon viewing by the individual;
allow the individual to scroll through the first content of the financial document;
tailor the financial document to include a signature block for the individual required to sign the financial document, including:
receive a selection of the signature block from the individual;
generate a signature overlay on the first content of the financial document;
receive a confirmation of a signature by the individual on the signature overlay; and
display second content associated with the anyone other than the individual upon viewing by the anyone other than the individual, wherein the second content includes at least one section of the financial document not displayed at all in the first content;
tailor the financial document to comply with federal and state laws and regulations, comprising highlighting each instance in the financial document of an interest rate or finance charge in bold or in a color other than black; and send the financial document to the mobile device, wherein the financial document is modified to include an index of an entirety of a plurality of sections of the financial document that is overlaid on the financial document displayed on the mobile device, and wherein advancement to another page in the financial document is allowed only after confirmation is received for a current page of the financial document.

\* \* \* \* \*